(12) United States Patent
Ahmed Ouameur

(10) Patent No.: US 10,256,892 B2
(45) Date of Patent: Apr. 9, 2019

(54) METHOD AND NETWORK NODE FOR CALCULATING TRANSMITTER PRECODING WEIGHTS AND RECEIVER COMBINING WEIGHTS FOR A MIMO ANTENNA SYSTEM

(71) Applicant: NUTAQ INNOVATION INC., Quebec (CA)

(72) Inventor: Messaoud Ahmed Ouameur, Quebec (CA)

(73) Assignee: NUTAQ INNOVATION INC., Quebec (CA)

( * ) Notice: Subject to any disclaimer, the term of this patent is extended or adjusted under 35 U.S.C. 154(b) by 0 days.

(21) Appl. No.: 15/749,408

(22) PCT Filed: Jul. 28, 2016

(86) PCT No.: PCT/IB2016/054535
§ 371 (c)(1),
(2) Date: Jan. 31, 2018

(87) PCT Pub. No.: WO2017/021835
PCT Pub. Date: Feb. 9, 2017

(65) Prior Publication Data
US 2018/0227037 A1    Aug. 9, 2018

Related U.S. Application Data

(60) Provisional application No. 62/200,274, filed on Aug. 3, 2015.

(51) Int. Cl.
*H04B 7/08* (2006.01)
*H04B 7/0417* (2017.01)
(Continued)

(52) U.S. Cl.
CPC ......... *H04B 7/0854* (2013.01); *H04B 7/0413* (2013.01); *H04B 7/0421* (2013.01);
(Continued)

(58) Field of Classification Search
CPC .... H04B 7/0854; H04B 7/0413; H04B 7/086; H04B 7/0421; H04B 7/0626; H04B 7/0617; H04B 7/0456; H04B 7/024
See application file for complete search history.

(56) References Cited

U.S. PATENT DOCUMENTS

| | | | |
|---|---|---|---|
| 2008/0227495 A1* | 9/2008 | Kotecha | H04B 7/0417 455/562.1 |
| 2013/0267163 A1* | 10/2013 | Anand | H04K 3/28 455/1 |

OTHER PUBLICATIONS

Kammoun et al., Low-Complexity Linear Precoding for Multi-Cell Massive MIMO Systems, Sep. 5, 2014, IEEE European Signal Processing Conference (EUSIPCO) 2014, pp. 2150-2154, received from the ISA/CA on Oct. 21, 2016.
(Continued)

*Primary Examiner* — Curtis A Alia
(74) *Attorney, Agent, or Firm* — BCF LLP

(57) ABSTRACT

The present disclosure relates to a method and a network node for calculating transmitter precoding weights and receiver combining weights for a multiple input multiple output (MIMO) antenna system. Channel responses are estimated at the network node for user terminals accessing the network node on a carrier. Zero forcing beamforming weights are determined for the carrier by adding one of the user terminals at a time in a calculation of an inverse of a Gram matrix containing parameters of the channel responses.

19 Claims, 5 Drawing Sheets

(51) Int. Cl.
  *H04B 7/0456* (2017.01)
  *H04B 7/06* (2006.01)
  *H04B 7/0413* (2017.01)
  *H04B 7/024* (2017.01)
(52) U.S. Cl.
  CPC ......... *H04B 7/0456* (2013.01); *H04B 7/0617* (2013.01); *H04B 7/0626* (2013.01); *H04B 7/086* (2013.01); *H04B 7/024* (2013.01)

(56) References Cited

OTHER PUBLICATIONS

Khan, Updating Inverse of a Matrix When a Column is Added/Removed, Feb. 27, 2008, University of British Columbia, Dept. of Computer Science, received from the ISA/CA on Oct. 21, 2016.
International Search Report of PCT/IB2016/054535; ISA/CA; Howard Sandler; dated Oct. 21, 2016.
Shariati et al., Low-Complexity Polynomial Channel Estimation in Large-Scale MIMO with Arbitrary Statistics, J. Sel. Topics Signal Process, 2013, pp. 1-16.
Yin et al., A Coordinated Approach to Channel Estimation in Large-Scale Multiple-Antenna Systems, IEEE J. Sel. Areas Commun., 2013, pp. 1-10.
Moshavi et al., Multistage Linear Receivers for DS-CDMA Systems, Int. J. Wireless Information Networks, 1996, pp. 1-17, vol. 3, No. 1.
Lei et al., Simplified Polynomial-Expansion Linear Detectors for DS-CDMA Systems, Electronics Letters, 1998, pp. 1-7, vol. 34, No. 16.
Le Josse et al., "Efficient Series Expansion for Matrix Inversion with Application to MMSE Equalization," IEEE Commun. Letters, vol. 12, No. 1, pp. 35-37, 2008.
Muller et al., Linear Precoding Based on Polynomial Expansion: Reducing Complexityin Massive MIMO, IEEE J. Sel. Topics Signal Process., submitted on 2014, pp. 1-18.
Beal, Variational Algorithms for Approximate Bayesian Inference, PhD. Thesis, Gatsby Computational Neuroscience Unit, May 2003, University College London.
Wang et al., Performance of Linear Interpolation-Based MINO Detection for MIMO-OFDM Systems, Wireless Communications and Networking Conference (WCNC), Mar. 2004, pp. 981-986.
Rosario et al., Fast Matrix Inversion Updates for Massive MIMO Detection and Precoding, IEEE Signal Processing Letters, Jan. 2016, pp. 75-79, vol. 23, No. 1.
Kay S., Fundamentals of Statistical Signal Processing: Estimation Theory. Prentice Hall, 1993, Cover Pages, Contents, Preface and pp. 1-195.
Kay S., Fundamentals of Statistical Signal Processing: Estimation Theory. Prentice Hall, 1993, pp. 196-389.
Kay S., Fundamentals of Statistical Signal Processing: Estimation Theory. Prentice Hall, 1993, pp. 390-595.

\* cited by examiner

METHOD AND NETWORK NODE FOR CALCULATING TRANSMITTER PRECODING WEIGHTS AND RECEIVER COMBINING WEIGHTS FOR A MIMO ANTENNA SYSTEM

TECHNICAL FIELD

The present disclosure relates to the field of wireless telecommunications. More specifically, the present disclosure relates to a method and a network node for calculating transmitter precoding weights and receiver combining weights for a multiple input multiple output (MIMO) antenna system.

BACKGROUND

In radio communications such as for example in the field of mobile wireless telecommunications, multiuser multiple-input and multiple-output (MU-MIMO) is a method for multiplying the capacity and spectral efficiency of a radio link using multiple transmit and/or receive antennas to exploit multipath propagation in order to serve more than one user on the same time-frequency resource block.

In its canonical form, large scale (Massive) MIMO system operates in time division duplex (TDD) mode, where the downlink and uplink transmissions are operating in the same frequency resource but are separated in time. The fact that physical propagation channels are reciprocal can be utilized in TDD operation [1]. Massive MIMO systems exploit the reciprocity to estimate the channel responses on the uplink and then use an acquired channel state information (CSI) for both uplink receive combining/detection and downlink transmit precoding/beamforming of the users' payload data. CSI may for example be acquired by transmitting predefined pilot signals and estimating the channel coefficients from the received signals [1]-[2]. An instantaneous channel matrix is acquired from the received pilot signal by applying an appropriate estimation technique. Channel estimation techniques such as the Bayesian minimum mean square error (MMSE) estimator and minimum-variance unbiased (MVU) estimator multiply the received pilot signal with an inverse of covariance matrices [3].

Theoretically, many antenna base stations promises manifold spectral capacity increase. This increase unfortunately comes at a cost of high processing complexity. In practical systems, given the lack of accurate knowledge of the channel and of the interference statistics, low computational complexity linear techniques such as conjugate match and zero forcing (ZF) have attracted large interest. Due to the inherent direct matrix inversion, polynomial expansion (PE) techniques have been utilized to further reduce ZF's computational complexity. These techniques readily lend themselves to trade-off between implementation complexity and performance.

Briefly stated, conventional techniques use mathematical operations with cubic order in computational complexity in the product of the number of antennas and the length of the pilot sequence. Therefore, the MMSE and MVU channel estimates oftentimes may not be calculated within an acceptable period of time. Moreover, the detection/precoding problem based on MMSE and ZF techniques is a mathematical operation with cubic computational complexity in the matrix dimension, which is equal to the number of users. In order to reduce such computational complexity one could resort to use polynomial expansion (PE) techniques [4]. PE approximates a matrix inversion by an L-degree matrix polynomial. The degree L is selected to balance between computational complexity and performance. If optimal coefficients are expensive to compute [4], some alternatives based on appropriate scaling [5] have been proposed. PE has been previously used in multiuser detection, where the decorrelating detector and the linear MMSE detector involve matrix inversions [6]. Recently, PE has also been used to reduce the precoding computational complexity in large-scale MIMO systems [7] where better performance was achieved by optimizing the matrix polynomials using asymptotic analysis.

Regardless, computational complexity is still important and known techniques used to reduce the amount of required calculations are relied on a trade-off between implementation complexity and performance Therefore, there is a need for improvements to reduce the amount of computational complexity in the determination of uplink receive combining/detection and downlink transmit precoding/beamforming parameters while limiting performance trade-offs.

SUMMARY

According to the present disclosure, there is provided a method implemented in a network node for calculating transmitter precoding weights and receiver combining weights for a multiple input multiple output (MIMO) antenna system. Channel responses are estimated at the network node for user terminals accessing the network node on a carrier. Zero forcing beamforming weights are determined for the carrier by adding one of the user terminals at a time in a calculation of an inverse of a Gram matrix containing parameters of the channel responses.

The present disclosure also relates to a network node calculating transmitter precoding weights and receiver combining weights for a multiple input multiple output (MIMO) antenna system. The network node comprises an array of antennas, an estimator and a weight calculator. The array includes M antennas adapted to transmit signals toward user terminals accessing the network node on a carrier and to receive signals from the user terminals. The estimator estimates channel responses received on the array of M antennas from the user terminals. The weight calculator determines zero forcing beamforming weights for the carrier by adding one of the user terminals at a time in a calculation of an inverse of a Gram matrix containing parameters of the channel responses.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

Like numerals represent like features on the various drawings.

DETAILED DESCRIPTION

Figure 1:
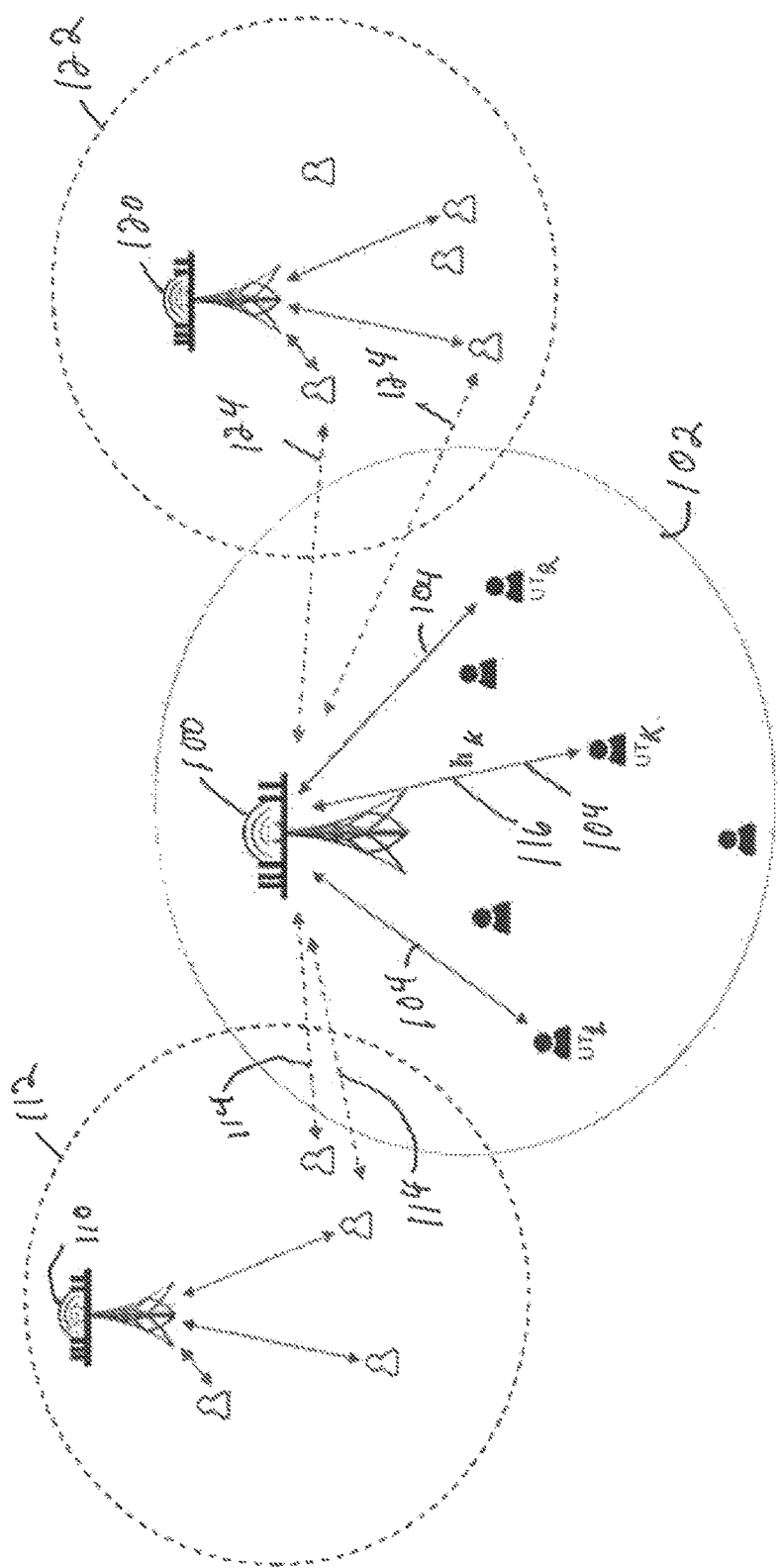
FIG. 1 is a network diagram showing a BTS having M antennas and serving K users.

Various aspects of the present disclosure generally address one or more of the problems related to the amount of computational complexity involved in the determination of uplink receive combining/detection and downlink transmit precoding/beamforming parameters and to the performance trade-offs of conventional solutions.

The present disclosure is based on applying matrix inversion lemma for inverting a Gram matrix of the form $X^T X$ when a new column is added or removed to, or from, a real-valued matrix X [8]-[9]. The lemma for a complex valued channel matrix is adopted and a procedure is devised where the channel vectors of user terminals (UT) are added or removed recursively. The present technology is not based on an approximation. As such, no optimization is required. Still, full or nearly full performance may be expected.

In an embodiment, a Gram matrix structure is exploited, wherein a matrix inversion lemma is used recursively on a UT channel's vector basis. While allowing the zero forcing (ZF) technique to keep its full potential performance, the present technology adaptively adds or removes a UT channel within one single iteration pass. Such characteristic enables devising efficient joint scheduling and precoding/detection schemes that may also be adapted, for example, to provide a good performance and implementation complexity balance when a per-user terminal's channel coherence time is well exploited.

This present disclosure mainly focuses, without limitation, on the downlink precoding (beamforming). It will however be understood that the problem formulation and solution may be extended to cover the uplink receiver combining as well.

The present disclosure describes solutions implemented in a network node. It is contemplated that advances in terms of processing power and mobile user terminal antenna technology will soon allow implementation of the same or equivalent solutions in a user terminal. Likewise, the present technology may be implemented in systems and networks using distributed antennas, for example in cases where remote radio heads are used.

The present technology may be applied generally in networks using MIMO antenna systems, including without limitation, systems using technologies such as, 5G, WiFi, Long Term Evolution (LTE and LTE-Advanced/Pro), WiMAX, High Speed Packet Access (HSPA) and the like.

The following acronyms are used throughout the present disclosure:
  BTS: base transceiver station;
  CBF: conjugate beamforming;
  CSI: channel state information;
  MIMO: multiple-input and multiple-output;
  MMSE: minimum mean square error;
  MVU: minimum-variance unbiased;
  RZF: regularized zero forcing;
  SINR: signal-to-interference-and-noise ratio;
  SNR: signal-to-noise ratio;
  TDD: time division duplex;
  PE: polynomial expansion;
  UT: user terminals;
  ZF: zero forcing;
  ZFBF: zero forcing beamforming;
  PE-ZFBF(L): polynomial expansion-zero forcing beamforming of degree L; and
  RMI-ZFBF: recursive matrix inversion zero forcing beamforming.

The following symbols are used throughout the present disclosure:
  K: number of user terminals;
  k: index designating a $k^{th}$ user terminal;
  X: N×K random matrix;
  $X^T X$: Gram matrix for X;
  $s_k$: a data signal transmitted by a $k^{th}$ user terminal;
  C: Complex valued set;
  $h_k$: $h_k \in C^{M \times 1}$ a channel for a $k^{th}$ user terminal;
  H: Hermitian transpose of a matrix;
  H: $H = [h_1, \ldots, h_K] \in C^{M \times K}$ channel matrix for K users;
  M: Number of antennas at BTS;
  $w_k$: linear beamforming vector for a $k^{th}$ user terminal;
  W: $w = [w_1, \ldots, w_K] \in C^{M \times K}$ beamforming matrix for K users;
  I: Identity matrix;
  $\Delta$: $\Delta = (H^H H)^{-1}$ inverse of Gram matrix for H;
  tr: trace of a matrix, i.e. the sum of all diagonal elements;
  $r_k$: a data signal received at a $k^{th}$ user terminal;
  $n_k$: an additive receiver noise at a $k^{th}$ user terminal;
  $\sigma^2$: variance of $n_k$;
  $\Xi$: intermediate matrix variable used in Tables I and II;
  z: intermediate vector variable used in Tables I and II;
  c: intermediate vector variable used in Tables I and II;
  $y_1$: intermediate vector variable used in Tables I and II;
  $y_2$: intermediate vector variable used in Tables I and II;
  $y_3$: intermediate vector variable used in Tables I and II;
  $\Gamma$: intermediate matrix variable used in Tables I and II;
  $\xi$: regularization parameter to provide a balance between inter-cell interference suppression and channel gain maximization;
  Q: regularization parameter to represent a subspace where interference is to be suppressed; and
  f: initial number of users.

Linear Precoding Techniques and Polynomial Expansion Approximation

Linear precoding with PE approximation is one of the widely known techniques used to reduce ZF implementation complexity. Referring now to the drawings, FIG. 1 is a network diagram showing a BTS having M antennas and serving K users. Without limitation, the present technology considers a downlink channel where a base transceiver station (BTS) equipped with M antennas is communicating with K single antenna user terminals (UT). The network diagram of FIG. 1 is applicable both to user terminals having a single antenna and user terminals with multiple antennas. As expressed hereinabove, the present technology is also applicable, in the reverse direction, to the uplink channel. In the context of the present disclosure, the term "BTS" incorporates any network node adapted to serve user terminals, including a radio base station (RBS), a base station controller (BSC), a NodeB, an eNodeB, a radio network controller (RNC), their combinations, and equivalents thereof. In particular, some of the features of the BTS described hereinbelow may be distributed over a plurality of nodes, for example over a BTS and an RNC, with or without an associate computational node. In the context of the present disclosure, a network node may thus include a plurality of cooperating nodes.

On FIG. 1, a first BTS 100 serves a number K of active and connected user terminals (UT), labelled $UT_1$, $UT_2$ ... $UT_k$ within a coverage area 102 of the first BTS 100. The BTS receives wanted signals 104 from the UTs located within its coverage area 102. Neighboring BTSs 110 and 120 have respective coverage areas 112 and 122. The first BTS 100 receives undesired interference signals 114 and 124 from other UTs located in the coverage areas 112 and 122.

A data signal 116 of transmitted by a user terminal $_k$ ($UT_k$) is denoted $s_k \in C$ and is normalized to unit power. A vector $h_k \in C^{M \times 1}$ represents the corresponding channel. K different data signals from K corresponding user terminal are separated spatially using linear beamforming vectors $w_1, \ldots, w_K \in C^{M \times 1}$, where the linear beamforming vector $w_k$ is associated with the user terminal k. It may be observed that the squared norm $\|w_k\|^2$ is the power allocated to the user terminal k. The downlink signal $r_k \in C$ received at the user terminal k as per equation (1):

$$r_k = h_k^H \left( \sum_{i=1}^{K} w_i s_i \right) + n_k \quad (1)$$

wherein $n_k$ is an additive receiver noise with zero mean and variance $\sigma^2$. Therefore, a signal-to-interference-and-noise ratio (SINR) at the user terminal k can be defined according to equation (2):

$$SINR_k = \frac{|h_k^H w_k|}{\sum_{i \neq k} |h_k^H w_i|^2 + \sigma^2} \quad (2)$$

Zero forcing beamforming (ZFBF) weights are given by equation (3):

$$W = H(H^H H)^{-1} \quad (3)$$

wherein $W = [w_1, \ldots, w_K] \in C^{M \times K}$ and $H = [h_1, \ldots, h_K] \in C^{M \times K}$. It is observed that an alternate technique called conjugate beamforming technique (CBF) considers the inverse of the Gram matrix $(H^H H)^{-1} = I$. In order to reduce the computation complexity of the ZFBF technique, the polynomial expansion technique may be applied to approximate the inversion $\Delta = (H^H H)^{-1}$ with L terms as shown on equation (4):

$$\hat{\Delta} = \kappa \sum_{l=0}^{L} (I - \kappa X)^l \quad (4)$$

wherein the parameter $\kappa$ is set equal to $2/\text{tr}(\Delta^{-1})$ as a suboptimal parameter setting. For optimal scaling one may refer to [7].

Figure 2:
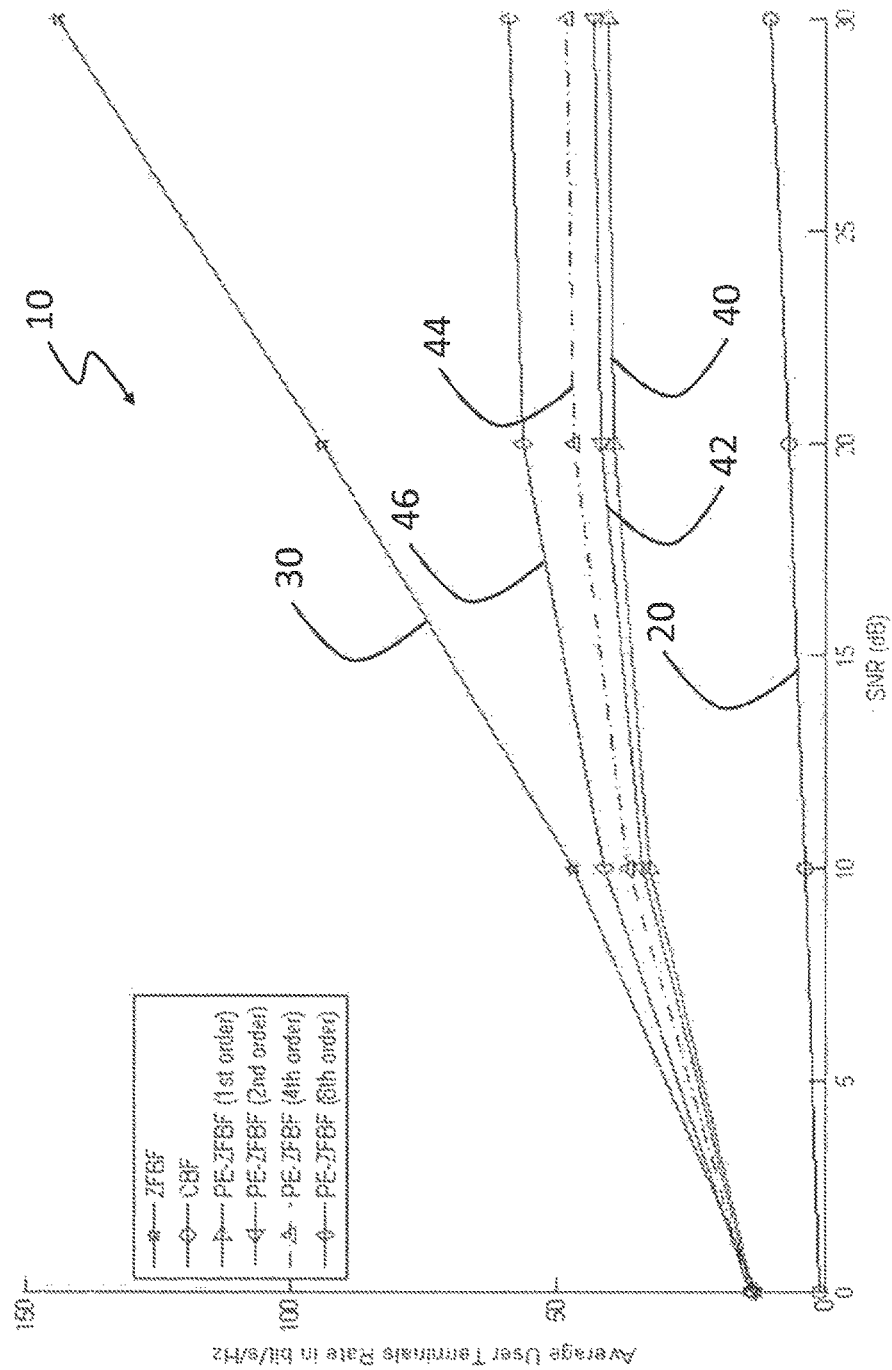
FIG. 2 is a graph showing achievable average user terminals rates for 65 BTS antennas and 15 user terminals using ZFBF and PE-ZFBF(L) techniques.

It will be appreciated that the complexity of the polynomial expansion ZF beamforming of order L (PE-ZFBF(L)) is sufficiently low to lend itself to recursive implementation using systolic arrays. For the sake of performance evaluation, a BTS with 64 antennas serving 15 active user terminals has been considered. FIG. 2 is a graph showing achievable average user terminals rates for 65 BTS antennas and 15 user terminals using ZFBF and PE-ZFBF(L) techniques. In FIG. 2, the channel coefficients are assumed to be i.i.d Rayleigh fading variables. Performance curves are shown in terms of average user terminal rates in bits per second per Hertz as a function of SNR (in dB) on a graph 10. A curve 20 shows the performance of a CBF technique and a curve 30 shows the performance ZFBF with direct matrix inversion, according to equation (3). The performance of PE-ZFBF(L) is depicted in for L equal to $1^{st}$, $2^{nd}$, $4^{th}$ and $8^{th}$ orders on curves 40, 42, 44 and 46, respectively. The performance of PE-ZFBF(L) improves as the degree L increases. While it has relatively low computational complexity, PE-ZFBF(L) is still far from meeting the potential performance of ZFBF at high SNR. In fact, one may expect that performance would improve if optimal polynomial coefficients were utilized. It should also be noted that if the system parameters change, for example when a new user starts being served by the BTS or when an active user stops being served by the BTS, channel state of a given user terminal changes faster and the scheduler needs to reconsider a new subset of users or a new power allocation. In these situations, all PE-ZFBF(L) weights, according to equation (4), are recalculated.

Novel Linear Precoding Technique

Exploiting the inverse of the Gram matrix structure of $\Delta = (H^H H)^{-1}$, it is possible to devise an efficient recursive calculation based on matrix inversion lemma where a new column is added [8]-[9]. More details may be found in Appendix B of [8].

In the present disclosure, a new column refers for example to a new user terminal channel vector. A calculation procedure disclosed herein is outlined in Table I.

TABLE I

Procedure for ZF beamforming weights computation by adding recursively one user terminal at a time

| | |
|---|---|
| Input: $\Xi = H$ | Consider the user terminals' channel vectors as input. |
| $\Delta^{(2)} = (\Xi_{(:,1:2)}^H \Xi_{(:,1:2)})^{-1}$ | Precompute inverse of $(2) \times (2)$ matrix for the first two user terminals. The inversion can start with any dimension (i.e. initial number f of users) however the recursive procedure below starts at k = f + 1. |
| Recursively for next user terminal k = 3 to K then DO: | |
| $z = \Xi_{(:,k)}$ | The $k^{th}$ column of $\Xi$ represents the next user terminal |
| $y_1 = \Xi_{(:,1:k-1)}^H z$ $y_2 = \Delta^{(k-1)} y_1$ $c = 1/(z^H z - y_1^H y_2)$ $y_3 = c \, y_2$ $\Gamma = \Delta^{(k-1)} + c \, y_2 y_2^H$ $\Delta^{(k)} = \begin{bmatrix} \Gamma & -y_3 \\ -y_3^H & c \end{bmatrix}$ | |
| End DO | |
| Consider permutation if last column/row is repositioned at a another column/row (the case if matrix inversion is updated when an existing user terminal channel changes for instance) | |
| Output: $W = H \Delta^{(K)}$ | |

The procedure described in Table I has been adopted for complex valued matrices and considers recursive addition of a user terminal channel vector. The procedure recursively computes $(H^H H)^{-1}$ as a new user terminal becomes active.

Another procedure described in Table II considers the removal of a user terminal channel vector.

TABLE II

Procedure for ZF beamforming weights update
when removing a user terminal at column 'k'

Input: $\Delta\langle^K\rangle = (H^H H)^{-1}$
Permute column k and row k of $x^{-1} = (H^H H)^{-1}$ to the last column and last row
then do:
$\Gamma = \Delta_{(1:\ K-1,\ 1:\ K-1)}\langle^K\rangle$
$c = \Delta_{(K,\ K)}\langle^K\rangle$
$y_2 = -\Delta_{(1:\ K-1,\ K)}\langle^K\rangle$
$y_1 = y_2/c$
$\Delta\langle^{K-1}\rangle = \Gamma - c\, y_1 y_1^H$
Output: $W\langle^{K-1}\rangle = H\langle^{K-1/k}\rangle \Delta\langle^{K-1}\rangle$     Wherein $H\langle^{K-1/k}\rangle$ denotes H without the $k^{th}$ column.

The computational complexity of the procedure described in Table II is low because the matrix inversion runs one single iteration pass to remove a user terminal having left the BTS.

When the channel state of a user terminal k changes, the matrix inversion update may be performed by first removing that user terminal k, using the procedure of Table II, and then adding the same user terminal k back with new channel state information, using the procedure of Table II. Hence, a first pass updates the matrix inversion by removing a column associated user terminal k (Table II) and a second pass updates the matrix inversion by adding a column associated user terminal k (Table I). In a case where a column is to be repositioned at column 'k', the procedure in Table I may permute the last row and column to the $k^{th}$ row and column respectively.

The recursive nature of the above-described procedures may for example be exploited when the user terminals have different channel coherence time constrains where only user terminals with short coherence time need faster updates. The impact on computational complexity saving and hardware implementation is self-evident. The regular data and operations flows enable efficient hardware implementation using pipelining and systolic array techniques. From the network/system level perspective, the synergy with a scheduler is also attractive.

Figure 3:
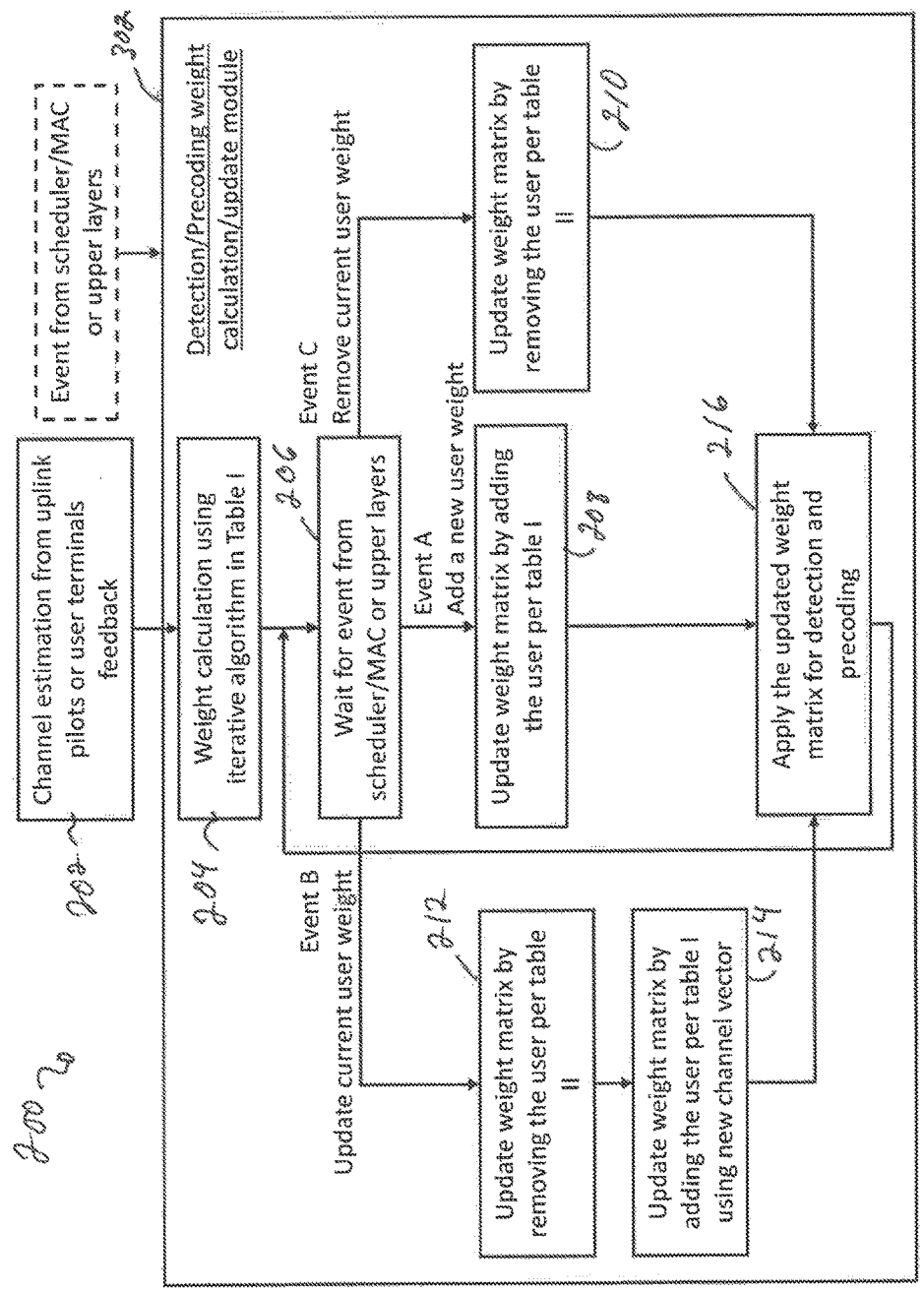
FIG. 3 is a sequence diagram showing operations of a detection/precoding weight calculation/update method.

The procedures of Tables I and II and the manner in which they are invoked are summarized in FIG. 3, which is a sequence diagram showing operations of a detection/precoding weight calculation/update method. FIG. 3 shows a sequence 200 comprising a plurality of operations that may be executed in variable order, some of the operations possibly being executed concurrently, some of the operations being optional. Most operations of the sequence 200 take place in a detection/precoding, weight calculation/update module 302 of the BTS; the manner in which the module 302 is incorporated in the BTS will be shown hereinbelow, in a description of FIG. 4. The sequence 200 will be described in the context of events related to a user; it will be understood that the sequence 200 may be performed concurrently at the BTS for a plurality of users.

At operation 202, an initial channel estimation is provided to the module 302 based on one or both of an uplink pilots received from the UT or from direct feedback information provided by the UT. The weight calculation procedure described in Table I is executed at operation 204 and the module 302 waits at operation 206 for an external event. At operation 208, the module 302 is informed of an event from a scheduler (not shown) of the BTS, an event detected at the media access control (MAC) layer by the BTS, or from an upper layer. In response to the event of operation 208, the module 302 may determine that a new user weight needs to be added (Event B), that a current user weight needs to be modified (Event B), or that a current user weight needs to be removed (Event C).

When a new user weight needs to be added, the procedure of Table I is invoked at operation 208 to update the weight matrix by adding the user. When a current user weight needs to be removed, the procedure of Table II is invoked at operation 210 to update the weight matrix by removing the user. When a current user weight needs to be modified, the procedure of Table II is invoked at operation 212 to update the weight matrix by removing the user, following which the procedure of Table I is invoked at operation 214 to update the weight matrix by adding the user again. Following any one of operations 208, 210 or 214, operation 216 applies the updated weight matrix for detection and precoding. Operation 216 is followed by a return to operation 206 where the module 302 awaits for another external event.

There is no fundamental distinction between operations 210 and 212 or between operations 208 and 214; these operations differ mainly in that they follow different triggering events. In an actual implementation, operations 210 and 212 may be realized as a single process and operations 208 and 214 may be realized as another single process.

Figure 4:
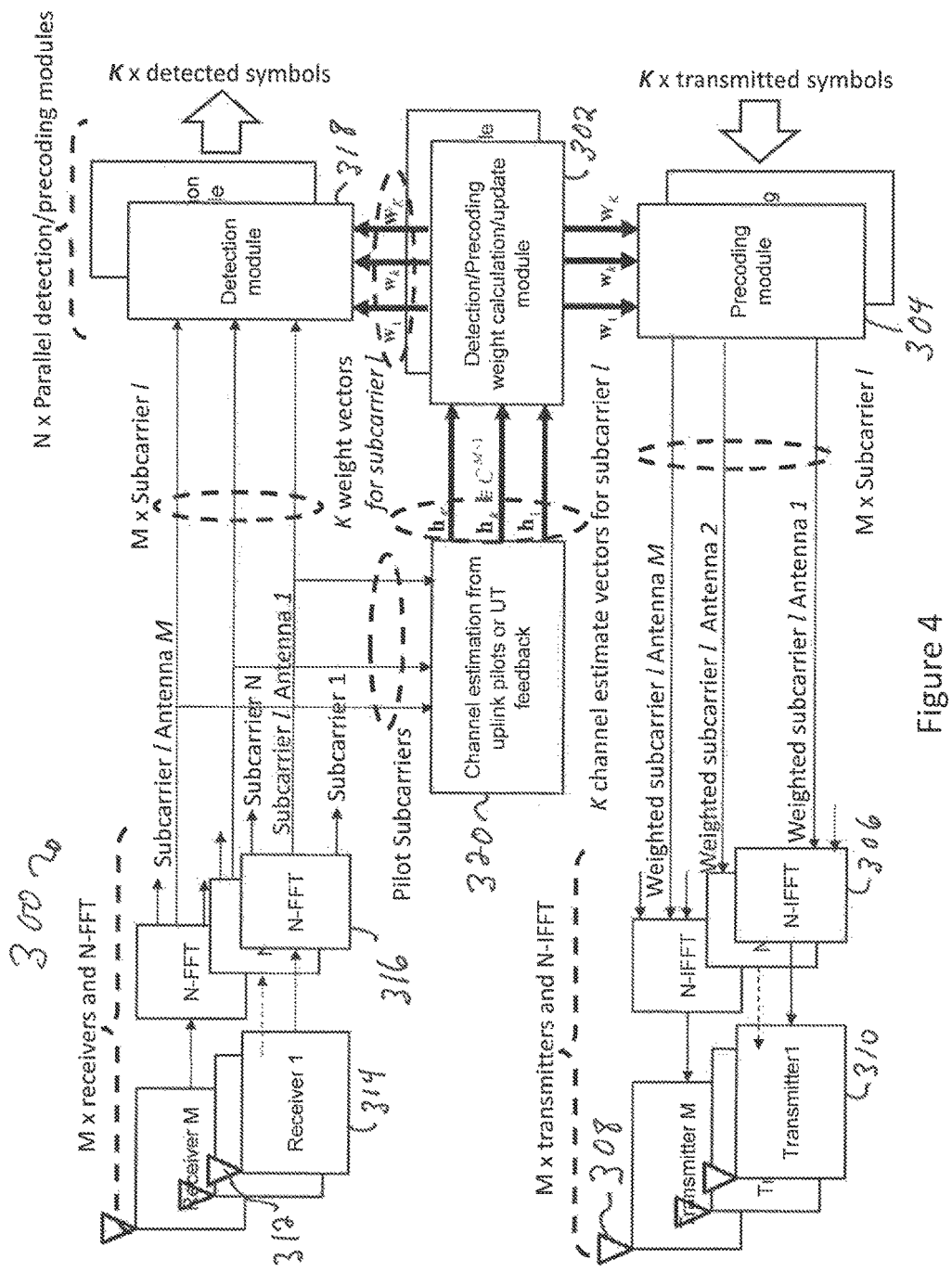
FIG. 4 is a block diagram of a receiver and transmitter processing chain implementing the method of FIG. 3.

FIG. 4 is a block diagram of a receiver and transmitter processing chain implementing the method of FIG. 3. This processing chain may for example be used in the context of a multicarrier transmission, for example when MIMO is used with orthogonal frequency division multiplex (OFDM) technology. The processing chain of FIG. 4 is used for channel estimation, detection, precoding weight calculation.

A BTS 300 includes a number of elements, some of which may comprise a plurality of parallel components so that the BS 300 may concurrently serve a plurality of UTs on a plurality of channels, subcarriers and/or antennas. As expressed in the foregoing description of FIG. 3, the detection/precoding, weight calculation/update module 302 of the BTS 300 implements a large part of the operations of the sequence 200.

On a transmission path, the BTS 300 comprises N precoding modules 304 adapted for preparing the transmission of symbols towards K distinct UTs (not shown, but equivalent to those shown on FIG. 1) over N subchannels, or subcarriers, based on weights such as $W=[w_1, \ldots, w_K] \in C^{M \times K}$ provided by the detection/precoding, weight calculation/update module 302 for each subcarrier, the symbols being spread over the N subcarriers. The symbols present on each of the N subcarriers are processed by M Inverse Fast Fourier Transform (N-IFFT) modules 306 that each can perform N IFFT operations, one for each of the N subcarrier. Outputs of the N-IFFT modules 306 are placed on M transmit antennas 308 by M transmitters 310. For ease of illustration, FIG. 4 highlights one subcarrier 1 out of the N subcarriers. It is to be understood that the number N of subcarriers may be greater than or equal to one.

On a receive path, the the BTS 300 comprises M receive antennas 312 connected to M corresponding receivers 314. Uplink signals received at the antennas 312 from the K UTs are processed by M corresponding Fast Fourier Transform (N-FFT) modules 316 that each can perform N FFT operations, one for each of the N subcarrier. Outputs of the N-FFT modules 316 are then forwarded to N detection modules 318. A channel estimator 320 senses the signals from the N-FFT modules 316, independently for each subcarrier l, to perform the operation 202 (FIG. 3) of providing a channel estimation of the subcarrier l to the module 302. The channel estimation is based on uplink pilots received from the K UTs, from a direct feedback information provided by the K UTs, or from both of these signals received from the K UTs on that subcarrier l. The detection modules 318 decode the symbols received from the K UTs based on the weights $W=[w_1, \ldots, w_K] \in C_{M \times K}$ provided by the detection/precoding, weight calculation/update module 302 for the subcarrier l.

In an embodiment, a same antenna may serve as both the transmit antenna 308 and the receive antenna 312 for a given subcarrier l.

In the same or another embodiment, each of the detection/precoding, weight calculation/update module 302, the precoding modules 304, the N-IFFT modules 306, the N-FFT modules 316, the detection modules 318, the channel estimator 320 and parts of the transmitters 310 and/or parts of the receives 312 may be configured to be processed by one or more processors (not shown), the one or more processors being coupled to a memory (not shown) comprising non-transitory code instructions for executing the tasks of these components of the BTS 300.

Figure 5:
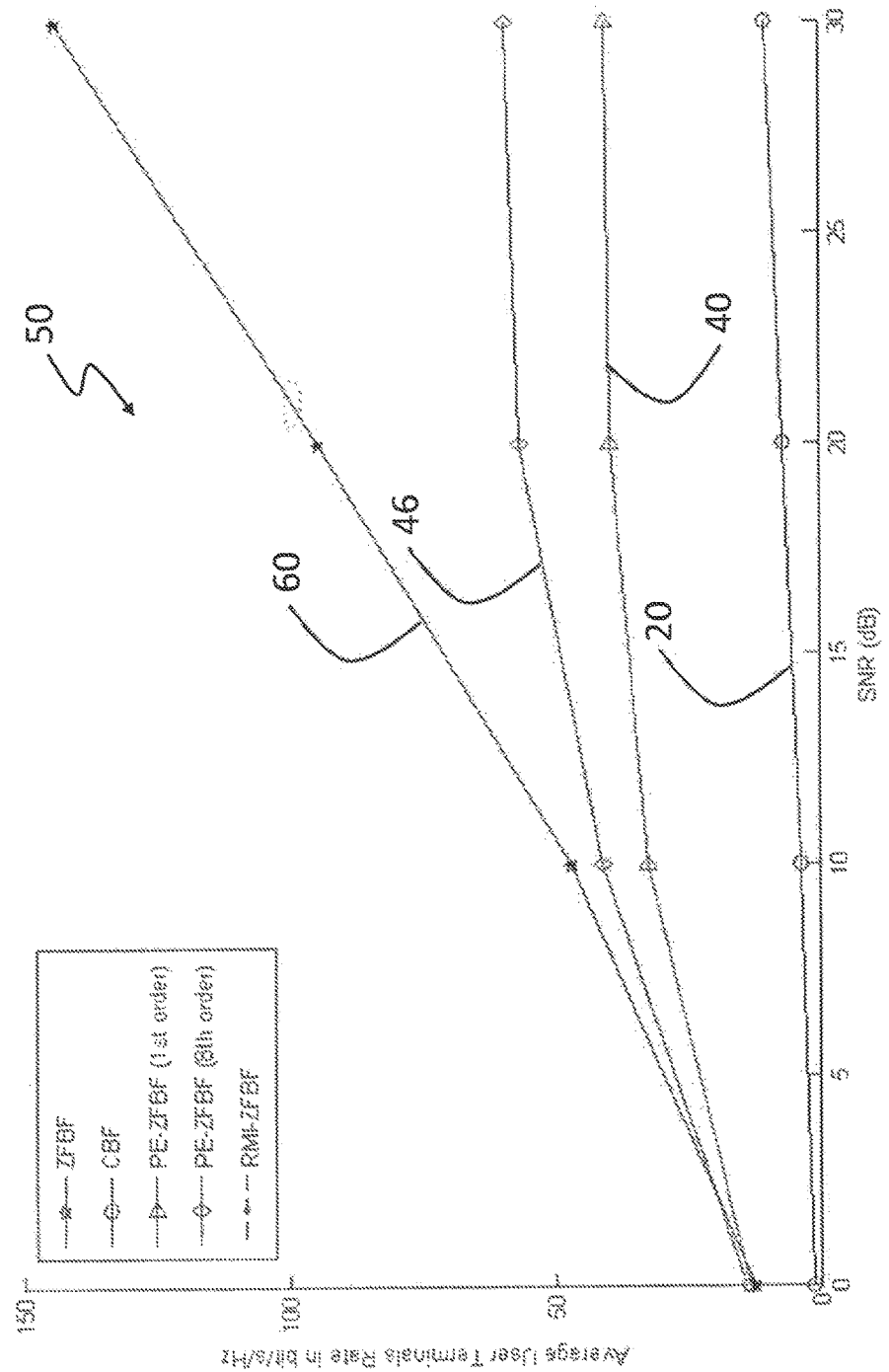
FIG. 5 is a graph showing achievable average user terminals rates for 65 BTS antennas and 15 user terminals using a RMI-ZFBF technique.

The BTS 300 is shown on FIG. 5 as an illustration of a possible practical realization. For example, in a variant, the N detection modules 318 may actually be realized as a single detection module having the capability to concurrently perform detection operations for the N subcarriers and for the K UTs.

FIG. 5 is a graph showing achievable average user terminals rates for 65 BTS antennas and 15 user terminals using a RMI-ZFBF technique. The results shown on FIG. 5 are based on performance simulations. Performance curves on a graph 50 are also expressed in terms of average user terminal rates in bits per second per Hertz as a function of SNR (in dB). The performance curves 20, 40 and 46 of FIG. 2 are reproduced on the graph 50 for ease of comparisons. A performance curve 60 for the RMI-ZFBF technique shows significant improvement over PE-ZFBF(L=8), curve 46. In fact, the performance curve 60 for the RMI-ZFBF technique is quite similar to the performance curve 30 for ZFBF with direct matrix inversion. Since the procedures of the present disclosure are not based on an approximation, being instead based on a recursive implementation of the ZF technique, the recursive matrix inversion ZF beamforming (RMI-ZFBF) shows no performance degradation.

Generalized Case with Interference

In an aspect of the present disclosure, the problem formulation may be augmented to consider interferences where a regularized ZF (RZF) beam forming would invert a matrix of the form expressed in equation (5):

$$\Delta_{RZF} = (H^H H + Q + \xi I)^{-1} \quad (5)$$

wherein $\xi$ and Q are regularization parameters. The parameter, $\xi$, provides a balance between being set to a low value for suppressing inter-cell interference and being set to a higher value for maximizing the channel gain at each user terminal. It therefore depends on SNRs, system dimensions and channel uncertainties. Meanwhile, Q may represent a subspace where interference is to be suppressed. The skilled reader will be able to adjust these parameters without undue experimentation. In regard to equation (5), equation (6) provides a joint matrix inversion lemma and PE technique to resolve the matrix inversion:

$$\Delta_{RZF} = (H^H H)^{-1} \left( I + (Q + \xi I)(H^H H)^{-1} \right)^{-1} \quad (6)$$

$$= (H^H H)^{-1} \sum_{n=0}^{\infty} (-1)^n \left( (Q + \xi I)(H^H H)^{-1} \right)^n$$

The term $(H^H H)^{-1}$ may either be computed using a PE technique or using the procedure of Table I. The summation term $$\sum_{n=0}^{\infty} (-1)^n \left( (Q + \xi I)(H^H H)^{-1} \right)^n$$

may optionally be truncated to fewer terms with optimized coefficients.

If n is set to zero, equation (6) reduces to the ZF beamforming. Otherwise, computational complexity and performance may be traded off considering several system level aspects, such as system dimension, SNRs, channel uncertainties, interference subspace to suppress, and hardware capability aspects to execute the computations within a fraction of the channel coherence time.

Conclusion

The present technology exploits the Gram matrix structure and applies recursively matrix inversion lemma as part of a procedure for computing the ZF beamforming weights, in which the user terminal channels are added recursively.

The present technology considers using one single pass procedure to remove a user terminal channel (Table II) and another pass to re-insert the user terminal channel (Table I) when the channel state of the intended user terminal changes.

The present technology considers updating the Gram inverse matrix when a new user terminal accesses the BTS.

The present technology considers updating the Gram inverse matrix when a user terminal leaves the BTS.

The present technology considers joint scheduler and precoding operation.

The present technology applies to uplink receiver combining (detection) using for instance ZFBF.

The present technology considers joint scheduler and receiver combining (detection) operation.

The present technology considers joint matrix inversion lemma and polynomial expansion for regularized ZF precoding and detection.

Inputs to the procedures described in Tables I and II may comprise a linear transformation of the estimated channel vectors H. For instance the channel vectors may be modified by reciprocity calibration coefficients.

In a variant, H may be replaced by $\tilde{H}$, which is a channel matrix projected on a subspace orthogonal to the intra BTS's interference channel. This variant may be particularly useful in the case of a group of users at edge of the coverage area of the BTS.

In another variant, H may be replaced $\tilde{H}=[H\ H_{Inter}]$, wherein $H_{inter}$ is a channel of interfering users (for example users from other cells causing inter-cell interference). In this case, the effective number of users may be considered as K plus the number of interfering users considered in $H_{Inter}$ (i.e. the number of columns of $H_{Inter}$). $H_{Inter}$ may be estimated by spanning all or few pilots assigned to the neighboring BTSs.

In a multicarrier case involving a plurality of subcarriers, the precoding/combining weights may be calculated on few well spaced subcarriers, depending for example on the channel coherence bandwidth. The rest of the weights may be deduced by means of interpolation. This variant may be viewed as an extension of [10] in the case of massive MIMO wherein huge computational saving may be expected.

For sake of simplicity, the present disclosure has mainly considered the case of single antenna user terminals. The skilled reader will appreciate that extending the teachings of the present disclosure to multi-antenna user terminals is straightforward. In such case, the effective number of users K may simply be increased to account for extra antennas per user terminal.

Those of ordinary skill in the art will realize that the description of the method and network node for calculating transmitter precoding weights and receiver combining weights for a MIMO antenna system is illustrative only and are not intended to be in any way limiting. Other embodiments will readily suggest themselves to such persons with ordinary skill in the art having the benefit of the present disclosure. Furthermore, the disclosed method and network node may be customized to offer valuable solutions to existing needs and problems related to the amount of computational complexity involved in the determination of uplink receive combining/detection and downlink transmit precoding/beamforming parameters and to the performance trade-offs of conventional solutions. In the interest of clarity, not all of the routine features of the implementations of the method and network node are shown and described. In particular, combinations of features are not limited to those presented in the foregoing description as combinations of elements listed in the appended claims form an integral part of the present disclosure. It will, of course, be appreciated that in the development of any such actual implementation of the method and network node, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of wireless telecommunications having the benefit of the present disclosure.

In accordance with the present disclosure, the components, process operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer or a machine and those operations may be stored as a series of instructions readable by the machine, they may be stored on a tangible medium.

Systems and modules described herein may comprise software, firmware, hardware, or any combination(s) of software, firmware, or hardware suitable for the purposes described herein. Software and other modules may reside on servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

REFERENCES

The following references are incorporated by reference herein in their entirety:
- [1] N. Shariati, E. Bjornson, M. Bengtsson, and M. Debbah, "Low Complexity Polynomial Channel Estimation in Large Scale MIMO with Arbitrary Statistics," J. Sel. Topics Signal Process., submitted on 2013 (available at: http://arxiv.org/pdf/1401.5703v1.pdf).
- [2] H. Yin, D. Gesbert, M. Filippou, and Y. Liu, "A coordinated approach to channel estimation in large-scale multiple-antenna systems," IEEE J. Sel. Areas Commun., vol. 31, no. 2, pp. 264-273, 2013.
- [3] S. Kay, Fundamentals of Statistical Signal Processing: Estimation Theory. Prentice Hall, 1993.
- [4] S. Moshavi, E. Kanterakis, and D. Schilling, "Multistage linear receivers for DS-CDMA systems," Int. J. Wireless Information Networks, vol. 3, no. 1, pp. 1-17, 1996.
- [5] Z. Lei and T. Lim, "Simplified polynomial-expansion linear detectors for DS-CDMA systems," Electronics Letters, vol. 34, no. 16, pp. 1561-1563, 1998.
- [6] N. Le Josse, C. Laot, and K. Amis, "Efficient series expansion for matrix inversion with application to MMSE equalization," IEEE Commun. Letters, vol. 12, no. 1, pp. 35-37, 2008.
- [7] A. Muller, A. Kammoun, E. Björnson, and M. Debbah, "Linear precoding based on truncated polynomial expansion—part I: Large-scale single-cell systems," IEEE J. Sel. Topics Signal Process., submitted on 2014. (Available at: http://arxiv.org/pdf/1310.1806.pdf).
- [8] Beal, M. J., Variational Algorithms for Approximate Bayesian Inference, PhD. Thesis, Gatsby Computational Neuroscience Unit, University College London, 2003.
- [9] M. E. Khan, "Updating Inverse of a Matrix When a Column is Added/Removed," technical report, UBC, February, 2008.
- [10] J. Wang and B. Daneshrad, "Performance of Linear Interpolation-Based MIMO Detection for MIMO-OFDM Systems," Wireless Communications and Networking Conference (WCNC), March 2004. Vol. 2, Pages 981-986.

What is claimed is:

1. A method in a network node implementing a multiple input multiple output (MIMO) antenna system, the method comprising:
   estimating, at the network node, channel responses for user terminals accessing the network node on a carrier;
   determining zero forcing beamforming weights for the carrier by adding one of the user terminals at a time in a calculation of an inverse of a Gram matrix containing parameters of the channel responses;
   receiving, at the network node, downlink symbols for transmission towards one of the user terminals;
   precoding the downlink symbols using the zero forcing beamforming weights; and
   transmitting, from the network node on the carrier, the precoded downlink symbols towards the one of the user terminals via an array of M antennas.

2. The method of claim 1, wherein the network node estimates the channel response for a given user terminal based on a predefined pilot signal received from the given user terminal.

3. The method of claim 1, wherein the network node estimates directly or indirectly the channel response for a given user terminal based on a feedback received from the given user terminal.

4. The method of claim 1, further comprising:
   estimating, at the network node, a channel response for a further user terminal accessing the network node on the carrier; and
   recalculating the inverse of the Gram matrix as a function of the channel response of the further user terminal;
   whereby a number of columns and a number of rows of the Gram matrix are each incremented by one.

5. The method of claim 1, further comprising:
   detecting that a first one of the user terminals previously accessing the network node on the carrier has become disconnected from the network node;
   permuting the previously calculated inverse of the Gram matrix so that a column and a row of the Gram matrix corresponding to the first one of the user terminals are placed on a last column and a last row of the Gram matrix; and
   deleting the last column and the last row of the Gram matrix.

6. The method of claim 1, further comprising:
   detecting, at the network node, a change of a channel response for a second one of the user terminals accessing the network node on the carrier;
   permuting the previously calculated inverse of the Gram matrix so that a column and a row of the Gram matrix corresponding to the second one of the user terminals are placed on a last column and a last row of the Gram matrix;
   deleting the last column and the last row of the Gram matrix; and
   recalculating the inverse of the Gram matrix as a function of the changed channel response of the second one of the user terminals;
   whereby a number of columns and a number of rows of the Gram matrix are each first decremented by one and then incremented by one.

7. The method of claim 1, wherein the carrier is a subcarrier of a multicarrier transmission system operating on a plurality of subcarriers, the method further comprising:
   determining zero forcing beamforming weights for a subset of the plurality of subcarriers; and
   calculating zero forcing beamforming weights for a remainder of the plurality of subcarriers by interpolating the zero forcing beamforming weights determined for the subset of the plurality of subcarriers.

8. The method of claim 1, further comprising combining the calculation of the inverse of the Gram matrix with a polynomial expansion to resolve a generalized interference case.

9. The method of claim 1, further comprising truncating a number of coefficients in the calculation of the inverse of the Gram matrix.

10. The method of claim 1, further comprising estimating, at the network node, specific channel responses for particular user terminals accessing the network node at an edge of its coverage area, the specific channel responses forming a matrix projected on a subspace orthogonal of an interference channel internal to the coverage area of the network node.

11. The method of claim 1, further comprising:
   estimating, at the network node, specific channel responses of interfering user terminals located outside of a coverage area of the network node; and
   recalculating the inverse of the Gram matrix as a function of the specific channel response of the interfering user terminals.

12. The method of claim 1, wherein:
   at least one of the user terminals is a multi-antenna user terminal; and
   determining zero forcing beamforming weights for the carrier comprises independently adding each antenna of the multi-antenna user terminal in the calculation of the inverse of the Gram matrix.

13. A network node implementing a multiple input multiple output (MIMO) antenna system, the network node comprising:
   an array of M antennas adapted to transmit signals toward user terminals accessing the network node on a carrier and to receive signals from the user terminals;
   an estimator of channel responses received on the array of M antennas from the user terminals;
   a weight calculator of zero forcing beamforming weights for the carrier by adding one of the user terminals at a time in a calculation of an inverse of a Gram matrix containing parameters of the channel responses;
   a precoding module adapted to receive downlink symbols for transmission towards one of the user terminals and to precode the downlink symbols using the zero forcing beamforming weights, wherein the precoding module is implemented using one of software, firmware, hardware and a combination thereof; and
   a transmitter adapted to transmit the precoded downlink symbols towards the one of the user terminals on the carrier via the array of M antennas.

14. The network node of claim 13, further comprising:
   at least one processor; and
   a memory coupled to the processor and comprising non-transitory code instructions that when executed cause the processor to implement the estimator and the weight calculator.

15. The network node of claim 13, wherein the channel responses depend at least in part on the number M of antennas.

16. The network node of claim 13, further comprising:
   an inverse Fast Fourier Transform (IFFT) module adapted to process the precoded downlink symbols before their transmission via the array of M antennas.

17. The network node of claim 13, further comprising:
a receiver of uplink symbols from a fourth one of the user terminals on the carrier;
a detection module adapted to use the zero forcing beamforming weights to combine the uplink symbols; and
a Fast Fourier Transform (FFT) module adapted to process the received uplink symbols before their detection by the detection module.

18. The network node of claim 13, wherein network node is adapted to communicate with the user terminals using a multicarrier transmission system operating on a plurality of subcarriers.

19. The network node of claim 13, wherein:
the estimator is adapted to estimate a distinct channel response for each antenna of a multi-antenna user terminal; and
the weight calculator is adapted to calculate zero forcing beamforming weights for the carrier by independently adding each antenna of the multi-antenna user terminal in the calculation of the inverse of the Gram matrix.

* * * * *